United States Patent [19]
Carroll

[11] Patent Number: 6,043,807
[45] Date of Patent: Mar. 28, 2000

[54] MOUSE FOR POSITIONING A CURSOR ON A COMPUTER DISPLAY AND HAVING A REMOVABLE PEN-TYPE INPUT DEVICE

[75] Inventor: Denise Kay Carroll, Orange Park, Fla.

[73] Assignee: AT&T Corp., New York, N.Y.

[21] Appl. No.: 08/932,777

[22] Filed: Sep. 23, 1997

[51] Int. Cl.[7] .................................................. G09G 5/08
[52] U.S. Cl. ...................... 345/163; 345/157; 345/179; 345/180
[58] Field of Search .................................... 345/163, 179, 345/180, 157; 178/18.03

[56] References Cited

U.S. PATENT DOCUMENTS

| | | | |
|---|---|---|---|
| 4,550,316 | 10/1985 | Whetstone et al. | 345/163 |
| 4,780,707 | 10/1988 | Selker | 340/710 |
| 5,291,213 | 3/1994 | Krauss | 345/179 |
| 5,371,516 | 12/1994 | Toyoda et al. | 345/179 |
| 5,434,594 | 7/1995 | Martinelli et al. | 345/163 |
| 5,635,957 | 6/1997 | Feierbach | 345/163 |
| 5,706,028 | 1/1998 | Murakami et al. | 345/157 |
| 5,736,980 | 4/1998 | Iguchi et al. | 345/179 |
| 5,764,224 | 6/1998 | Lilja et al. | 345/179 |

Primary Examiner—Steven J. Saras
Assistant Examiner—Fritz Alphonse
Attorney, Agent, or Firm—Oliff & Berridge, PLC

[57] ABSTRACT

A mouse for positioning the cursor on a computer display is equipped with a removable or retractable pen-like input device for inputting and digitizing analog tracings. When removed from the mouse, the pen-like input device can be used to enter figures, letters, numerals or the like into a computer to which the mouse is connected, in the exact pattern followed by the pen-like device. The pen-like device may be integral with the mouse such that the entire mouse body becomes a pen-like body with a retractable pen-like body having sensors for tracing and entering figures, letters, numerals, and the like into a computer. The mouse and the pen-like device are equipped with X and Y motion sensors for sensing a change in location of the sensors and thereby a change in location of either the mouse or the pen-like input device.

14 Claims, 4 Drawing Sheets

MOUSE FOR POSITIONING A CURSOR ON A COMPUTER DISPLAY AND HAVING A REMOVABLE PEN-TYPE INPUT DEVICE

BACKGROUND OF THE INVENTION

1. Field of Invention

This invention relates to a computer input device known as a mouse and more specifically to a mouse having a retractable pen-like body for inputting and digitizing analog tracings.

2. Description of Related Art

It is known in the art to reposition a cursor on a computer video display using a pointing device, the most common of which is known as a mouse. The mouse is a device for relatively moving a cursor displayed on a computer video display, and can be used to draw figures or the like when the user moves the mouse in conjunction with software which permits and accepts tracing information. A mouse may take the form of a body having a rotatably supported ball whose angular displacement is used to detect the distance traversed by the mouse, or a touch pad where a user glides his finger across a pressure sensitive pad which translates finger movement into cursor movement. Another mouse variation is a body having an opening on its bottom surface, an opti-electrical transducer contained in the body emitting and detecting reflected light through the opening as the mouse is traversed over a reflecting surface.

Mice shaped like pens are also known in the art, for example, U.S. Pat. No. 5,434,594 to Martinelli et al. teaches a pen-shaped mouse where a user holds the unit like a pen and at the expected point end is a ball whose response to motion is detected by sensors inside the pen-like body. Buttons activating switches are located on the main shaft of the pen-like body.

In operation, all mice detect movement in the X and Y plane when a user moves the mouse in anticipation of moving a cursor on a video display.

Mechanical mice are generally constructed having a spherical ball protruding below a bottom surface of the mouse, the ball freely rotating as the mouse is moved by the user along a flat surface. Inside the mouse, the ball is coupled to sensors which detect and translate the motion of the mouse, this translated motion signal output from the mouse to the computer. The sensors may be mechanical or opti-electrical. When the mouse is used for purposes other than repositioning a cursor, for example, drawing pictures or tracing, the mouse becomes bulky and awkward to use.

A pen-like mouse gives the user the ability to draw and trace with ease and accuracy unavailable in a table top mouse described above, however, when the user requires use of the mouse for general cursor control, the pen-like mouse becomes awkward to constantly pick up and put down. Thus, when a user desires to draw with a mouse, a pen-like mouse is more suitable. However, when a user desires to use the mouse for cursor control, a desk top mouse is more appropriate. Today's computer systems generally limit the number of input devices, for example, a keyboard and a mouse, making two different movable pointing devices impractical. Additionally, two moveable pointing devices would undoubtedly cause a conflict with today's computer software.

SUMMARY OF THE INVENTION

In view of the aforesaid problems of the conventional computer input devices, it is an object of the present invention to provide a mouse with a retractable pen-like input device, the pen-like device, when removed from the mouse, can be used to enter figures, letters, numerals, etc. into a computer to which the mouse is connected, in the exact pattern followed by the pen-like device.

To achieve the above objective, there is provided a mouse-type computer input device comprising an enclosure that lies flat on a work space, a user-actuated switch located on a surface of the enclosure and outputting switch information when the switch is actuated, an X and Y motion sensor for sensing a change in location of the mouse and outputting location information, interface circuitry for converting sensor output location information and switch output information into mouse output information for transference to the computer and a removable elongated pen-like housing adapted to be held by a user, the pen-like housing having a data receptive end and a data transmission end. The data receptive end senses X and Y movement of the pen-like housing and outputs change in movement information to either the mouse for transmission to the computer or directly to the computer. Since the pen-like housing is retractably mounted within the mouse, the pen-like pointing device is available to a user whenever use of a pen-like mouse is desired.

Still other objects and advantages of the present invention will become readily apparent to those skilled in the art from the following detailed description, where I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and descriptions are to be regarded as illustrative in nature, and not as restrictive.

DETAILED DESCRIPTION OF PREFERRED EMBODIMENTS

Figure 1:
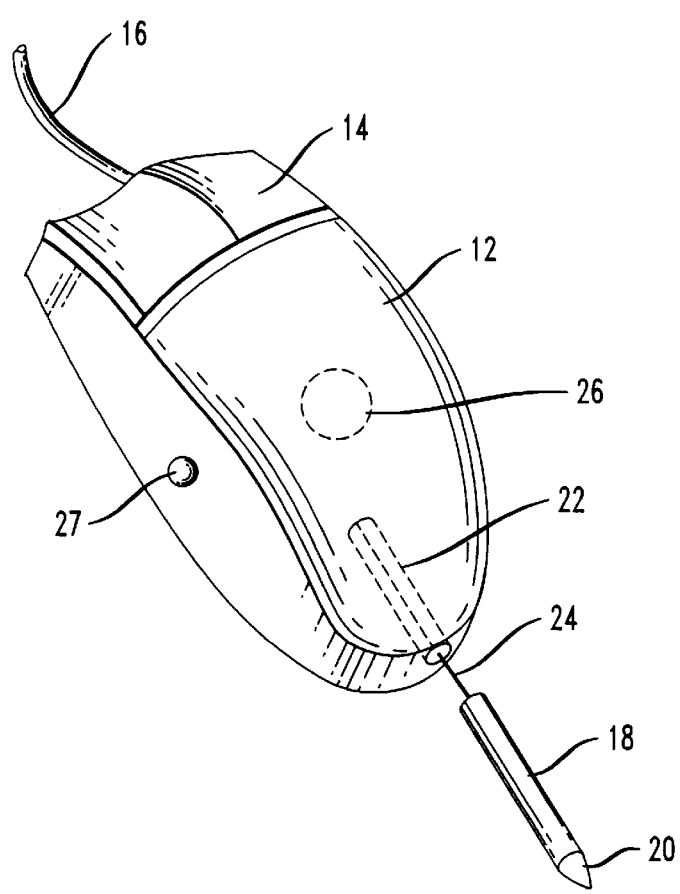
FIG. 1 is a perspective view of a mouse and pen-type computer input device according to a first embodiment of the present invention.

The present invention is directed to a unique apparatus configuration of a mouse having a removable pen-type computer input device. As shown in FIG. 1, a mouse 10 has a body 12, switches 14, X-Y tracking device 26 exposed on a base side 13 and is connected to a computer (not shown) by way of cord 16. A pen-type computer input device 18 is removable from a recess 22 used for recess and tip of pen in FIG. 1 of mouse body 12. The pen-type input device 18 has a data receptive end 20, and is connected to the mouse by way of a cord 24. Cord 24 may be used for transmitting output from the data receptive end 20 to the computer (not shown). Cord 24 is connected at one end to the pen-type input device 18 and at the other end connected to an interface circuit (not shown) within the mouse body 12. The signals being transmitted from the pen-type input device 18 go through the cord 24 into the interface circuit, and on to the computer via cord 16.

The data receptive end 20 senses X and Y movement of said pen-like device 18. The pen-type input device 18 may be used by a user to input signatures, drawings, traces or other analog equivalents of writing such that the data receptive end transmits the X-Y movement of the pen 18 to the computer via the cord 24 through the mouse body 12. Alternatively, the pen-type device 18 may transmit the X-Y movement of the pen-type unit 18 directly to a computer using wireless data transfer, for example, IrDA or laser. The data receptive end 20 which senses X and Y movement of the pen-type units 18, 28, 38, 48, 58 and 68 shown in FIGS. 1 and 3–7 may be any of the type of X-Y sensors known in the art, for example, rotating spheres with internal mechanical and/or electrical and/or optical sensors, a LED, a laser or other optical methods of sensing movement. Cord 24 connected to the pen-type unit 18 may be conventional wiring used to transmit mouse information, or may be any other connecting means used for such transmission, for example, fiber optic.

In another embodiment, the pen-type input device is locked into a recess 22, and a button 27 located on the mouse body 12 activates a release mechanism (not shown) for releasing the pen-type input device from the mouse body 12.

Figure 2:
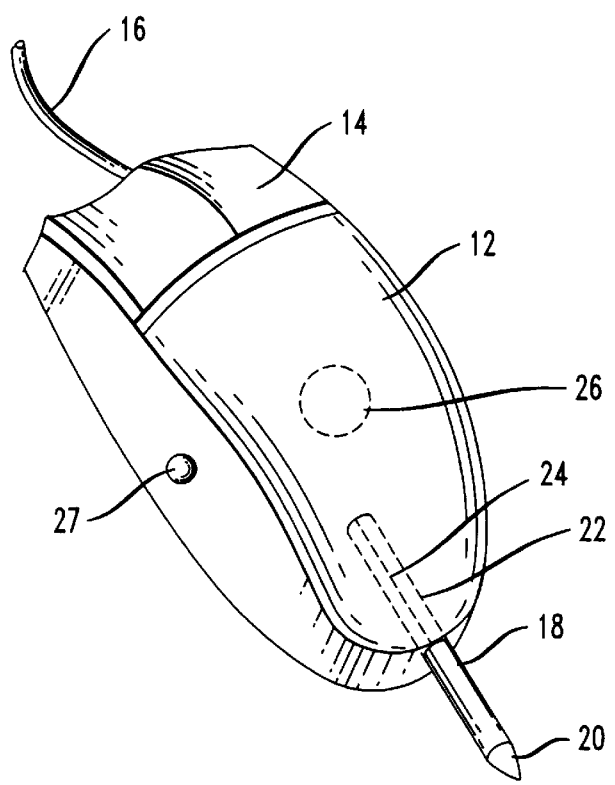
FIG. 2 is a perspective view of a mouse with a non-removable pen-type computer input device according to a second embodiment of the present invention.

In a second embodiment depicted in FIG. 2, the pen-type input device 18 is not removable from mouse body 12 rather, the pen-type input device 18 extends longitudinally from the mouse body 12. In this manner, the entire mouse 10 is used as a pen-type input device, the mouse body 12 acting as the pen-body.

Figure 3:
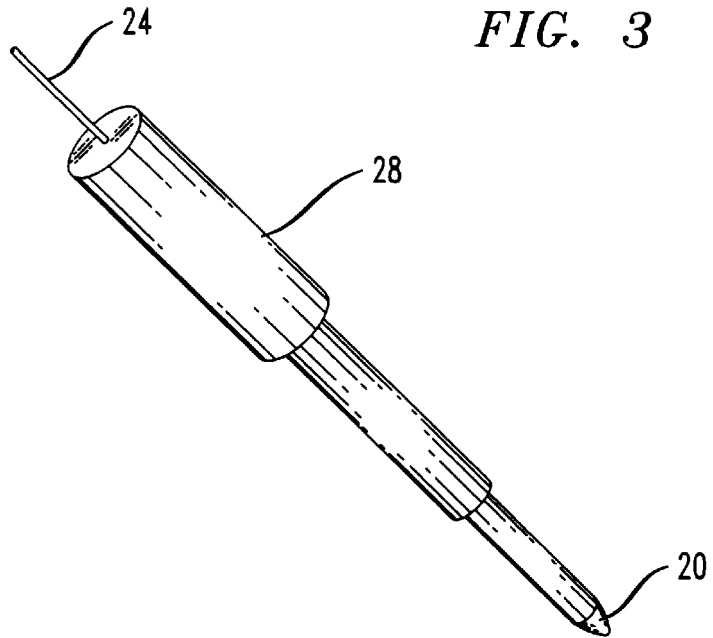
FIG. 3 is a perspective view of a pen-type computer input device according to a third embodiment of the present invention.

In a third embodiment depicted in FIG. 3, the pen-type input device 28 is telescoping, such that when the pen-type input device 28 is removed from mouse body 12, the pen-type device 28 may be expanded to a length comfortable for use by a user as a writing instrument.

Figure 4:
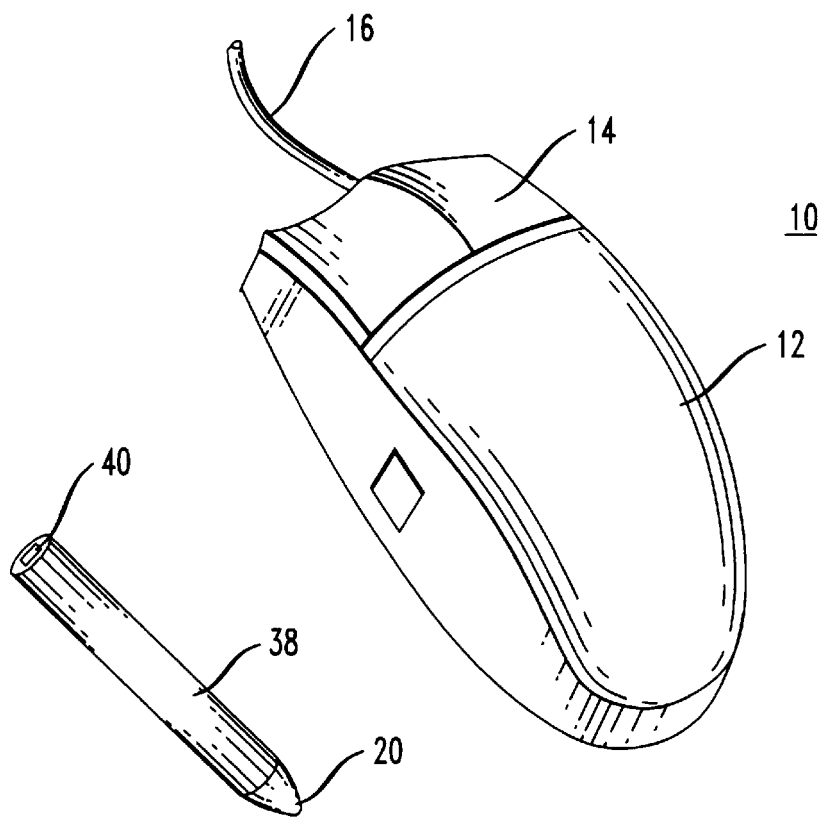
FIG. 4 is a perspective view of and pen-type computer input device according to a fourth embodiment of the present invention.

In a fourth embodiment shown in FIG. 4, the pen-type device 38 is equipped with an IrDA unit 40 which transmits X-Y movement of the pen-like input device 38 to an IrDA receptor 42 located on the mouse body 12 or at the computer.

Figure 5:
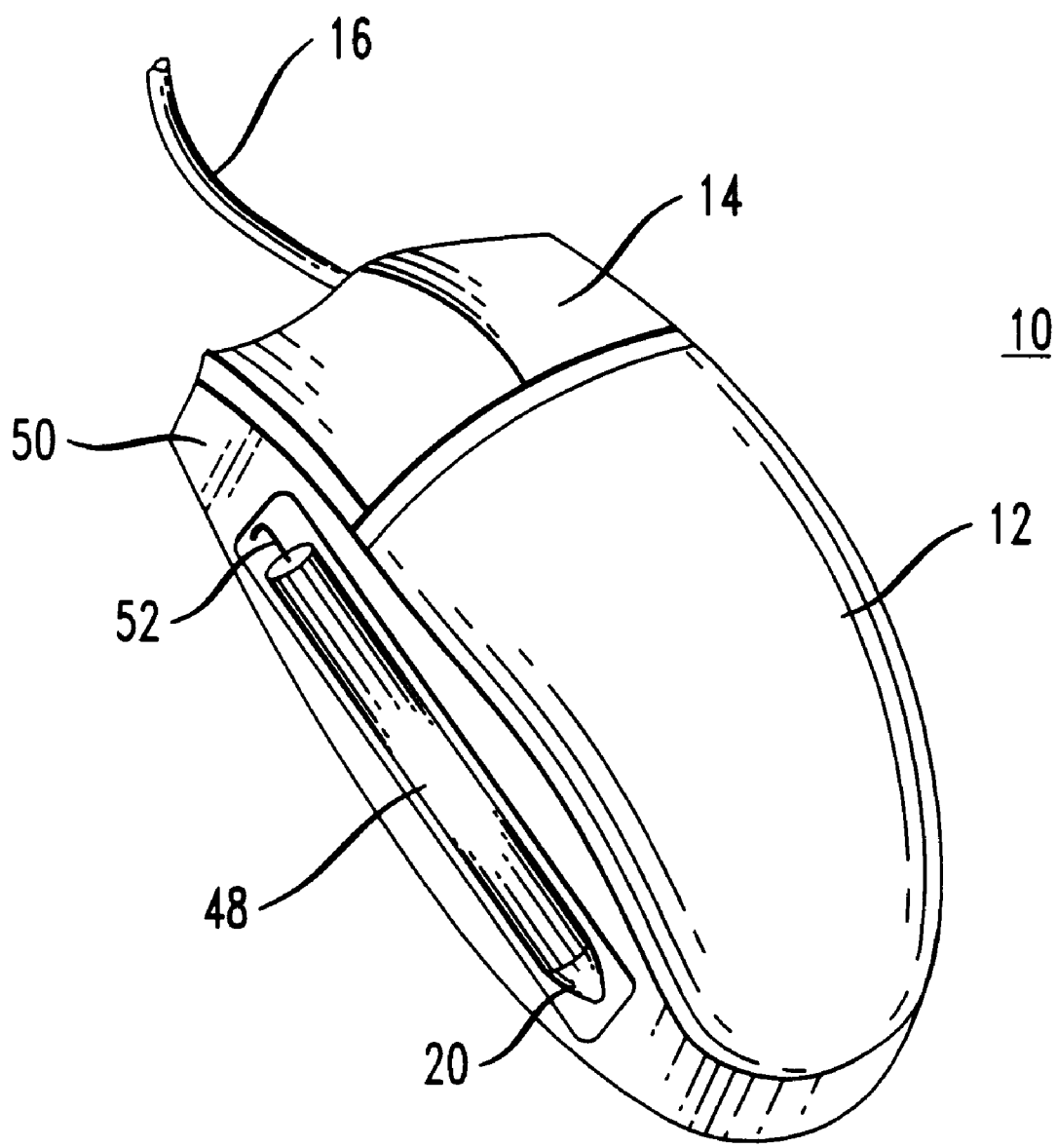
FIG. 5 is a perspective view of a mouse and pen-type computer input device according to a fifth embodiment of the present invention.
Figure 6:
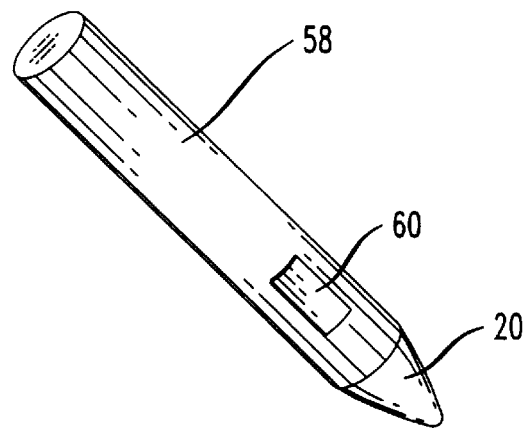
FIG. 6 is a perspective view of a mouse and pen-type computer input device according to a sixth embodiment of the present invention.

In a fifth embodiment depicted in FIG. 5, the pen-type device 48 is recessed on a side 50 of mouse body 12 for easy removal by a user. The pen-type body 48 may be attached to the mouse body by a retractable cord 52 for transmission of X-Y movement of the pen-type input device 48 to the computer by way of the mouse 10, or the pen-type input device may be equipped with an IrDA unit similar to that described in a previous embodiment.

The pen-type input device 18 can be used not only to draw curves such as figures, letters, numerals, symbols or the like, but also to control the cursor display on a computer. In a sixth embodiment of this invention depicted in FIG. 6, the pen-type input device 58 has a button 60 similar in function to mouse button 14, acting as a control button permitting entry of data signals to the computer.

Figure 7:
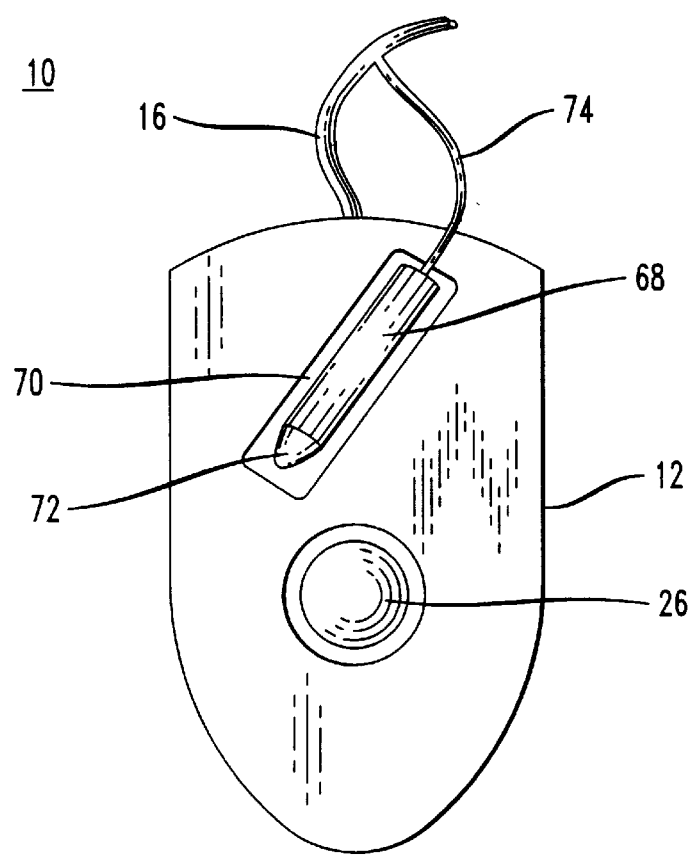
FIG. 7 is a bottom view of a mouse and pen-type computer input device depicting a pen-type input device recessed into the base of a mouse according to a seventh embodiment of the present invention.

In a seventh embodiment depicted in FIG. 7, the pen-type input device 68 is removable from a recess 70 in the bottom surface of mouse body 12. In this manner the pen-type input device 68 is readily accessible to a user while remaining out of sight during operation of mouse 12. The pen-type input device 68 has a data receptive end 72 located at a first longitudinal end. At the second longitudinal end the pen-type input device has an output cord 74 connected to the output cord 16 of mouse 10.

Although certain preferred embodiments have been shown and described, it should be understood that many changes and modifications may be made therein without departing from the scope of the appended claims.

What is claimed is:

1. A mouse-type computer input device comprising:
   an enclosure that lies flat on a work space;
   a user-actuated switch located on a surface of the enclosure and outputting switch information when the switch is actuated;
   an X and Y motion sensor for sensing a change in location of said sensor and outputting location information;
   interface circuitry for converting X and Y motion sensor output location information and switch output information into mouse output information for transference to a computer; and
   a removable elongated pen-like housing for holding by a user, said pen-like housing having a data receptive end that senses X and Y motion of the data respective end and a data transmission end.

2. The mouse-type computer input device of claim 1, wherein said data receptive end senses X and Y movement of said pen-like housing and outputs change in X and Y movement information.

3. The mouse-type computer input device of claim 2, wherein said data transmission end transmits the output change in X and Y movement information to the mouse.

4. The mouse-type computer input device of claim 2, wherein said data transmission end transmits the output change in movement information to said computer.

5. The mouse-type computer input device of claim 1, wherein said pen-like housing is attached at said data transmission end to said mouse.

6. The mouse-type computer input device of claim 1, wherein said pen-like housing is a digital pen.

7. The mouse-type computer input device of claim 6, wherein said digital pen digitizes a tracing made by a user of said pen and transmits the digitized tracing to the computer.

8. The mouse-type computer input device of claim 6, wherein the digital pen digitizes a tracing made by a user of said digital pen and transmits the digitized tracing to the computer using infrared transmission.

9. The mouse-type computer input device of claim 6, wherein the digital pen digitizes a tracing made by a user of said digital pen, outputs the digitized tracing to said mouse, said mouse transmitting the digitized tracing to the computer.

10. The mouse-type computer input device of claim 1, wherein said pen-like housing is longitudinally expandable.

11. The mouse-type computer input device of claim 1, wherein said pen-like housing is removably recessed in said enclosure.

12. The mouse-type computer input device of claim 1, further comprising a recess in said enclosure for storing said pen-like housing, said recess having an attachment mechanism for attaching said pen-like housing in said recess, and a release mechanism for releasing or locking said pen-like housing in said recess.

13. A mouse type computer input device comprising:

an enclosure that lies flat on a work space;

a user-actuated switch located on a surface of the enclosure and outputting switch information when the switch is actuated;

an X and Y motion sensor for sensing a change in location of said sensor and outputting location information;

interface circuitry for converting the X and Y motion sensor location information and the switch information into mouse output information for transference to a computer; and a retractable pen-like housing being extendible longitudinally from said enclosure and including a data receptive end that senses X and Y motion of the data receptive end, wherein said mouse-type computer input device may be used as a pen-type computer input device.

14. A device for tracing an analog writing and inputting into a computer using a mouse-type computer input device equipped with a removable pen-like housing, comprising:

mouse-type computer pointing means having a first X and Y motion sensor for moving a curser on a screen; and tracing means for tracing data for input into the computer, said tracing means comprising;

an elongated pen-like housing having a data receptive end and a data transmission end, said data receptive end further comprising a second X and Y motion sensor for sensing a change in location of said second X and Y motion sensor and outputting location information, and interface circuitry for converting location information for transference to the computer.

\* \* \* \* \*